United States Patent
Panda et al.

(10) Patent No.: US 11,891,863 B2
(45) Date of Patent: Feb. 6, 2024

(54) METHODS AND APPLICATIONS OF WEAR RESISTANT MATERIAL ENHANCED VIA MATRIX AND HARD-PHASE OPTIMIZATION

(71) Applicant: Halliburton Energy Services, Inc., Houston, TX (US)

(72) Inventors: Krutibas Panda, The Woodlands, TX (US); Brian Lee Doud, Klein, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 973 days.

(21) Appl. No.: 16/480,646

(22) PCT Filed: Aug. 29, 2018

(86) PCT No.: PCT/US2018/048597
§ 371 (c)(1),
(2) Date: Jul. 24, 2019

(87) PCT Pub. No.: WO2020/046295
PCT Pub. Date: Mar. 5, 2020

(65) Prior Publication Data
US 2020/0332607 A1    Oct. 22, 2020

(51) Int. Cl.
*C23C 6/00* (2006.01)
*E21B 17/10* (2006.01)
(Continued)

(52) U.S. Cl.
CPC ........ *E21B 17/1085* (2013.01); *B23K 35/365* (2013.01); *C23C 6/00* (2013.01);
(Continued)

(58) Field of Classification Search
CPC .. E21B 17/1085; E21B 10/46; E21B 17/1014; B23K 2101/002; B23K 2101/20; B23K 35/365; C23C 24/103; C23C 6/00
See application file for complete search history.

(56) References Cited

U.S. PATENT DOCUMENTS

| 4,156,374 A | 5/1979 | Shwayder |
| 5,755,299 A * | 5/1998 | Langford, Jr. ..... B23K 35/0266 |
| | | 175/375 |

(Continued)

FOREIGN PATENT DOCUMENTS

| WO | 2011003051 | 1/2011 |
| WO | 20170132471 | 8/2017 |

OTHER PUBLICATIONS

Lincoln Electric Co. "Hardfacing Product and Procedure Selection". Jun. 2014. Cleveland, OH.
(Continued)

*Primary Examiner* — Jie Yang
(74) *Attorney, Agent, or Firm* — Benjamin Ford; C. Tumey Law Group PLLC (57) ABSTRACT

Hardfacing is used to protect wear surfaces of drill bits and other downhole tools. A hardfacing member can be formed by heating a metal matrix material, e.g., via a laser process, injecting a plurality of particles into the heated metal matrix material, disposing the mixture on at least a portion of a substrate thereby forming a hardfacing member having a particle-embedded metal matrix material, and attaching the hardfacing member to a main body.

17 Claims, 6 Drawing Sheets

(51) Int. Cl.
*B23K 35/365* (2006.01)
*C23C 24/10* (2006.01)
*B23K 101/20* (2006.01)
*B23K 101/00* (2006.01)
*E21B 10/46* (2006.01)

(52) U.S. Cl.
CPC ...... *C23C 24/103* (2013.01); *B23K 2101/002* (2018.08); *B23K 2101/20* (2018.08); *E21B 10/46* (2013.01)

(56) References Cited

U.S. PATENT DOCUMENTS

| | | | |
|---|---|---|---|
| 5,944,127 A | 8/1999 | Liang et al. | |
| 2006/0283017 A1 | 12/2006 | von Gynz-Rekowski | |
| 2008/0073125 A1 | 3/2008 | Eason et al. | |
| 2009/0117787 A1* | 5/2009 | Kerner | H01R 43/048 439/877 |
| 2010/0038145 A1* | 2/2010 | Lockstedt | E21B 10/52 175/425 |
| 2010/0193253 A1 | 8/2010 | Massey et al. | |
| 2012/0125695 A1* | 5/2012 | Vempati | E21B 10/62 175/428 |
| 2012/0281938 A1 | 11/2012 | Peterson et al. | |
| 2014/0054027 A1* | 2/2014 | Bird | E21B 10/46 166/243 |
| 2018/0229467 A1 | 8/2018 | Walker et al. | |

OTHER PUBLICATIONS

UK Search and Examination Report for Application No. GB1910491.8 dated Jan. 24, 2020.
ISRWO International Search Report and Written Opinion for PCT/US2018/048597 dated May 24, 2019.
Suryanarayana et al. Nanocrystalline Materials—Current Research and Future Directions, Hyperfine Interactions, Apr. 2012, pp. 5-44, Kluwer Academic Publishers, Netherlands.
GCC Examination Report for Application No. GC 2019-37964, dated Sep. 6, 2020.

* cited by examiner

| Materials | Hardness (HRc) | Abrasion Resistance Factor (ARF=1/ASTM G65 mass loss (g)) |
|---|---|---|
| SHS9290P | 73 | 10.8 |
| SHS9192P | 71 | 10.6 |
| SHS9800P | 70 | 8.7 |
| SHS9700P | 68 | 7.4 |
| SHS9500P | 60 | 6.3 |
| Chrome and complex carbides | 58 | 5.3 |
| Cast iron and tool steels | 47 | 2.2 |
| Martensitic materials | 42 | 0.6 |

METHODS AND APPLICATIONS OF WEAR RESISTANT MATERIAL ENHANCED VIA MATRIX AND HARD-PHASE OPTIMIZATION

TECHNICAL FIELD

The present description relates in general to wear resistant materials, including methods and applications of wear resistant material enhanced via matrix and hard-phase optimization.

BACKGROUND

In the field of oil and gas exploration and production, a downhole drilling tool, such as a rotary steerable tool, typically uses a hard or highly wear resistant material for drilling, and/or pushing against the wellbore formation. Hardfacing of metal surfaces and substrates is a well-known technique to minimize or prevent erosion and abrasion of the metal surface or substrate. Because hardfacing parts are expected to wear, they require replacement on a regular basis, and therefore minimization of cost and servicing of the parts is desired. Thus, there is a need for enhanced wear resistant material that can be used in superior hardfacing drilling parts that can prolong the utility life of the tools while minimizing the cost for both the parts and servicing thereof.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The preferred embodiments of the present invention and its advantages are best understood by referring to FIGS. 1-6 of the drawings, like numerals being used for like and corresponding parts of the various drawings.

The present disclosure includes various hardfacing methods, such as to protect wear surfaces of drill bits and other downhole tools used in the oil and gas industry. Hardfacing generally involves applying a layer of hard, abrasion resistant material to a less resistant surface or substrate by plating, welding, spraying or other deposition techniques.

Generally, the hardfacing members or parts can be made from metal or metallic alloy matrix materials. A metal matrix material may be formed as a hard, abrasion, erosion and/or wear resistant material, which may be layered on a working surface and/or substrate to protect the working surface and/or substrate from abrasion, erosion and/or wear. A "metallic alloy matrix material" is a metal matrix material that can constitute alloy matrix from either paramagnetic family or ferromagnetic family. Various materials can be used in the matrix of the metal matrix material, such as cobalt, chromium, niobium, nickel, titanium, boron, molybdenum, aluminum, copper, carbon, manganese, vanadium, silicon, iron and alloys thereof. In addition, the metal matrix material can include hard, abrasion resistant materials and/or particles dispersed therein and bonded thereto. In some implementations, various types of tungsten carbide particles or encapsulated diamond particles having an optimum weight percentage of binder or binding material may be included as part of a metal matrix material of the hardfacing member or part in accordance with the present disclosure.

Figure 1:
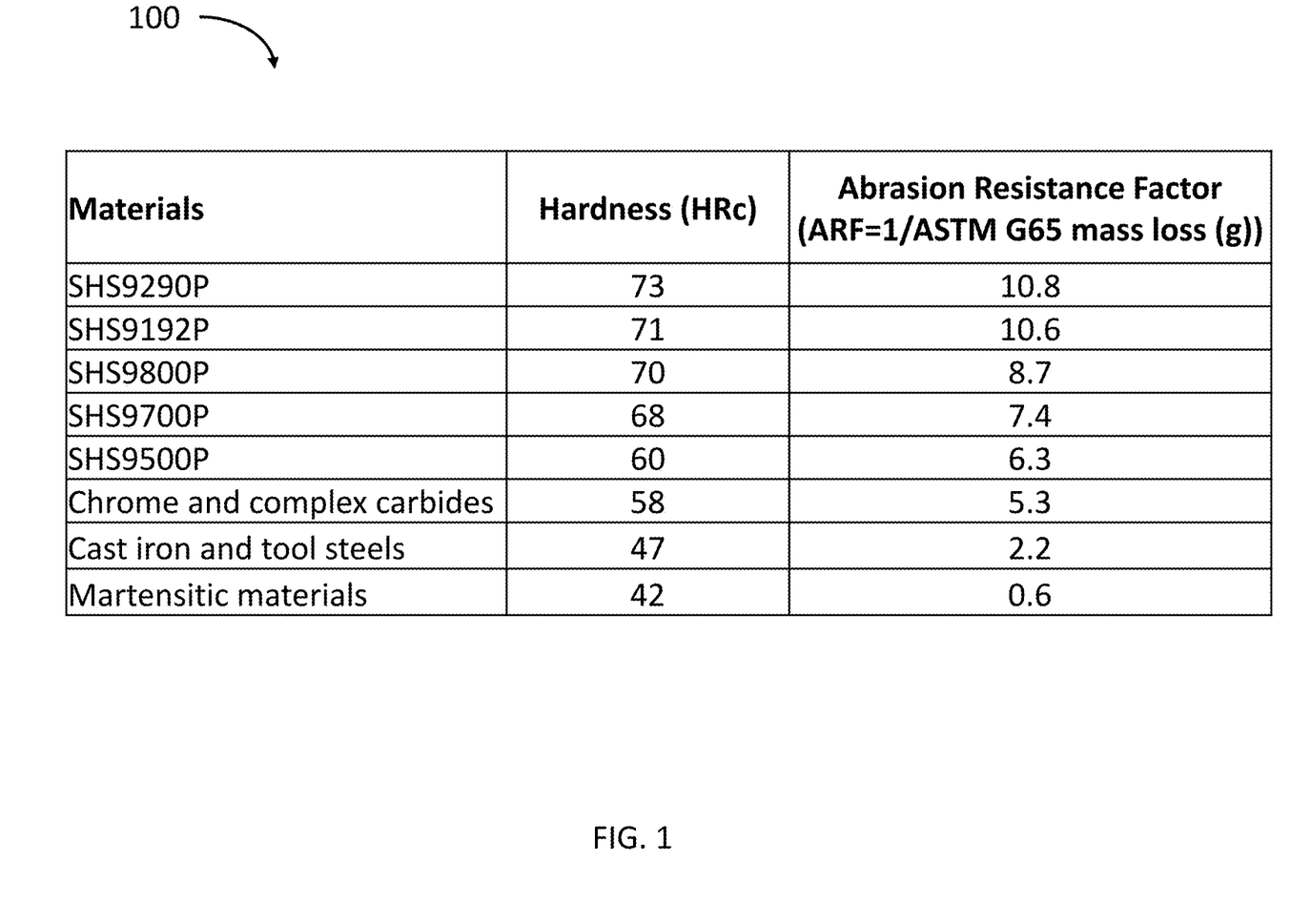
FIG. 1 shows a table of wear resistant materials with values of their hardness and abrasion resistance factor.

A metal matrix material may be formed from a wide range of metal alloys and hard materials. FIG. 1 is a table 100 of example wear resistant materials, with nominal values of their hardness and abrasion resistance factors. Some of the wear resistant materials shown in the table 100 can be used as the base metal matrix material for embedding or bonding to a plurality of hard phase particles for forming a hardfacing member as described herein. FIG. 1 includes materials available from Weartech International (Weartech® is a registered trademark of Lincoln Global, Inc.), such as SHS9192P, SHS9290P, SHS9500P, SHS9700P and SHS9800P, which are examples of a group of materials generally referred to herein as "nanosteel," "nanosteel alloys," or "nanosteel alloy family", possess high hardness and high abrasion resistance, and thus suitable to be used a metal matrix material for embedding or bonding to a plurality of hard phase particles for forming a hardfacing member as described herein. In some embodiments, the nanosteel includes a metal matrix material having nanocrystalline grains having an average grain size less than one micrometer.

A plurality of hard phase particles as described herein include materials, such as tungsten carbide, encapsulated diamond, sintered diamond, or similar hard phase materials. The term "tungsten carbide" or "WC" may include mono-tungsten carbide (WC), ditungsten carbide ($W_2C$), macrocrystalline tungsten carbide. The term "encapsulated diamond" refers to particles of diamond substantially or completely coated with a coating, where a coating includes a coating of carbide material, such as a tungsten carbide or a borocarbide.

The technologies described herein include methods of enhancing wear resistant material that can be used in superior hardfacing drilling parts or components that can prolong the utility life of the tools while minimizing the cost for both the parts and servicing thereof. Various welding processes are generally available, the particular uses of which are more particularly described herein, in forming hardfacing (e.g. a hardfacing member described herein). The welding processes available to heat a metal matrix material include plasma transfer arc (PTA), Oxyacetylene, gas metal arc welding (GMAW), and laser. The lower-heat welding processes are preferred, most particularly laser. Among the various welding techniques available, laser generally has the lowest heat input, potentially resulting in the smallest heat affected zone (HAZ), but for certain technical challenges. In one aspect, the metal matrix material may be heated using a laser, and an energy input from the laser process may be adjusted to increase interfacial strength between the plurality of particles and the metal matrix material. Another aspect of forming a hardfacing member include adjusting a laser or a PTA process to incorporate a plurality of particles into a metal matrix material, including amorphous iron-based materials, such as a nanosteel alloy, for hardfacing applications.

The methods also include forming a hardfacing member comprising a plurality of (hard phase) particles embedded in a metal matrix material, and wherein the plurality of particles includes at least one of the hard phase materials: tungsten carbide, encapsulated diamond, sintered diamond, or similar hard phase materials.

In some embodiments, the methods include attaching the hardfacing member to a main body, such as a drilling component or a rotary steerable tool, via at least one of: brazing, a removable mechanism using a copper shim or gasket, or a custom designed material combination of using a gradient of a soft material and a hard material. In some embodiments, the method of attaching the hardfacing member to the main body is such that the member can be removed from the main body and replaced with a new piece after it is worn, thereby saving the base material in the main body for continued use.

As described herein, the methods used for attaching the hardfacing member to the main body include a dovetail joint, shrink fit and any other swappable or removable attachment mechanism. In some embodiments, a copper shim or gasket is used to form fit or tight fit the hardfacing member into a slot designed specifically to accommodate the hardfacing member onto the main body. Rather than applying the hardfacing member directly to the main body, such as through a welding process to permanently adjoin the two parts, the methods disclosed herein include forming a hardfacing member separately and then attaching it at a later time to the main body via a removable mechanism.

Welding or brazing the hardfacing member to the main body is also contemplated as a process of attaching the member. In certain implementations of the methods herein, welding or brazing is done such that the welded or brazed joint could be removed by a process such as grinding, thereby allowing the hardfacing member to be readily removed. Additionally, a welded joint could be used in combination with the dovetail joint to provide a secondary or primary means to prevent the hardfacing member from coming separated downhole. A continuous joint or tack weld could be used. Furthermore, the hardfacing member does not have to be removable and it could still provide benefits in regards to manufacturability and cost.

Advantageously the methods described herein can offer overall cost savings of the hardfacing members on rotary steerable tools, compared to current approaches that incur high maintenance costs. The methods offer the potential to minimize cost of the parts and cost of servicing by simplifying the manufacturing process by specializing the forming process. For example, specializing the process of forming a hardfacing member and scaling up the production of it can decrease per piece cost of the hardfacing member. Further, overall costs may also be reduced by being able to remove and replace only the worn hardfacing member while keeping the main body from damaging from repeated impact loads to be reusable, or recyclable for further use.

Another benefit of producing the hardfacing member as a separate and individual part, is that the hardfacing member can be designed for increased performance, i.e., better wear resistance, and/or minimal cost.

An individual hardfacing member can be made several different ways with several different hardfacing materials and processes. The hardfacing materials and processes include laser applied WC and diamond, WC and diamond inserts in a matrix material, and sintered diamond and carbide particles in a WC matrix. In some embodiments, the hardfacing member can be produced via a number of different combinations of processing technique and material composition, including using a laser applied WC powder with a metal matrix, a sinter hipped WC encapsulated diamond, functionally graded sinter hipped WC plus encapsulated diamond plus softer graded substrates, thermally stable polycrystalline (TSP) diamond and TSP diamond coated with WC in a metal matrix, a laser applied diamond powder with a metal matrix, TSP diamond inserts in a metal matrix, WC inserts in a metal matrix, Oxy applied hardfacing in rod or wire form in a metal matrix, polycrystalline diamond compacts (PCD) inserts pressed or brazed, along with a WC and metal matrix or sintered hardfacing.

In some embodiments, the methods also include using a combination of large and small particles for the reinforcing different phases in the matrix as well as for optimizing the packing fraction of the particle-matrix mixture and for increasing wear resistance of the resulting mixture. In some embodiments, the methods include strengthening the interfacial strength between with the hard phase particles and the metal matrix material, such as for example by improving the carbide-matrix interface or the encapsulated diamond-matrix interface to reduce the pull-out of these hard phase particles when the hardfacing member undergoes abrasive wear. The pull-out of hard particles is a major issue with currently available tools and the interfacial properties are limiting the overall effectiveness of the hard particles. Pull-out can occur when sufficient matrix surrounding the particles is worn away, for example when approximately half of the particle is no longer surrounded by the matrix.

Nanosteel materials shown in FIG. 1 as a metal matrix material has excellent wear resistance. The Nano-structured hard carbide phases embedded in the nanosteel matrix material substantially improves the matrix wear behavior. The nanosteel matrix material can reduce preferential matrix wear and pull-out behavior for the harder phase particles and therefore, has the potential to fundamentally change the wear mechanism and dramatically improve the wear performance. In some embodiments, the material is available in powder, wires, rods making it useable to a wide range of processes, including laser process, PTA, Oxyacetylene, and any other suitable processes.

The nanosteel alloy family includes a number of alloys that are customizable matrices based on the desired mechanical properties. The choice of matrix added to a diverse range of processes and a wide array of customizable hard phase materials and particles with varying sizes, phase fractions and material types. Since iron is generally less expensive than nickel, nanosteel matrix material is less expensive compared to the nickel based matrix material. Therefore, nanosteel based hardfacing family can be a less expensive alternative for all drilling tools that currently utilize non-ferromagnetic based matrix materials.

In some implementations, the nanosteel matrix material is applied with the automated robotic laser process to produce components, such as rotary steerable pads. The application of the laser process to directly produce a final form is possible due to the accuracy of the laser process, thus reducing cost related to additional steps in the manufacture of the part. Any reduction in the processing complexity or cost can lead to further adoption of the specific method, such as the laser process, which in turns lead to a wider usage of the parts and components made using the specific method. If the nanosteel matrix material is applied with the laser process, used downhole worn parts can be repaired or refurbished to a new condition because the low heat input of the laser localizes the heat transfer to the worn area being repaired or refurbished. And since the localized heating does not distort other areas of the downhole parts, the remainder of the downhole parts, such as the body of a rotary steerable pad, which is the expensive component, can be salvaged.

Figure 2:
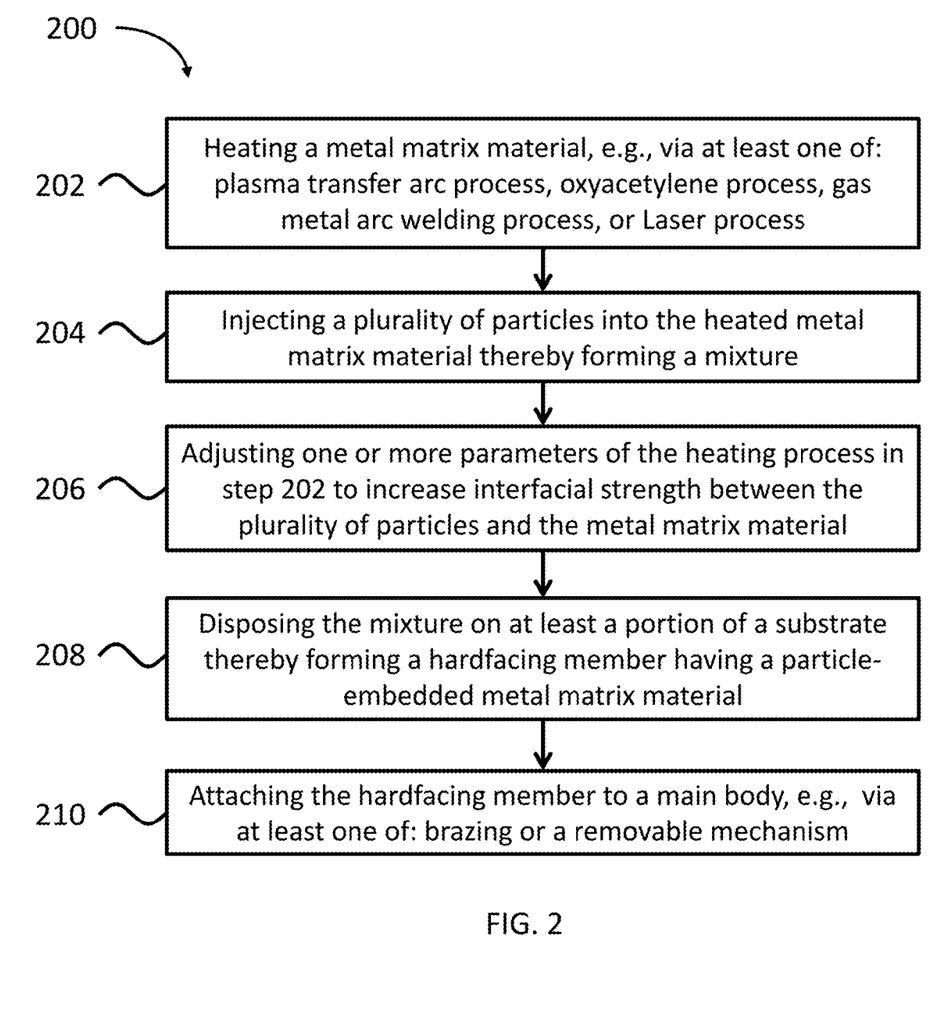
FIG. 2 shows a process flow for forming a hardfacing member that can be attached to a drilling tool.

FIG. 2 shows a process flow 200 for forming a hardfacing member that can be attached to a drilling tool. The process flow 200 begins with step 202 for heating a metal matrix material. Such heating can occur via at least one of: plasma transfer arc process, oxyacetylene process, gas metal arc welding process, or laser process. At step 204, a plurality of particles are injected into the heated metal matrix material thereby forming a mixture. In some embodiments, the plurality of particles are injected via an injection process that utilizes a feed system that includes, such as for example, feeding hoppers. In some embodiments, the metal matrix material in powder form as well as the plurality of particles are pre-blended and fed into the hoppers. Step 206 allows one or more parameters of the selected process in step 202 can be used to increase interfacial strength between the plurality of particles and the metal matrix material. In some embodiments, the interfacial strength is optimized by the selection of the matrix metal material and heat input from the selected source.

At step 208, the mixture is disposed on at least a portion of a substrate thereby forming a hardfacing member having a particle-embedded metal matrix material. In some embodiments, the mixture containing the plurality of particles and the metal matrix material falls through the hopper onto the substrate as the selected process (such as, a laser process) melts the mixture onto the substrate. In some embodiments, the bonding strength at the interface between the plurality of particles and the metal matrix material can be increased so that the pull-out of the particles can be minimized. The higher the interfacial or bonding strength, the higher the resistance and abrasive properties the hardfacing member containing the particle-embedded metal matrix material possesses. Once the hardfacing member is formed or produced, step 210 directs attaching the hardfacing member to a main body, e.g., via at least one of: brazing or a removable mechanism. In some embodiments, attaching the hardfacing member to the main body includes the use of a dovetail joint, shrink fit and any other swappable or removable attachment mechanism. In some embodiments, a copper shim or gasket is used to form fit or tight fit the hardfacing member into a slot designed specifically to accommodate the hardfacing member onto the main body.

Figure 3A:
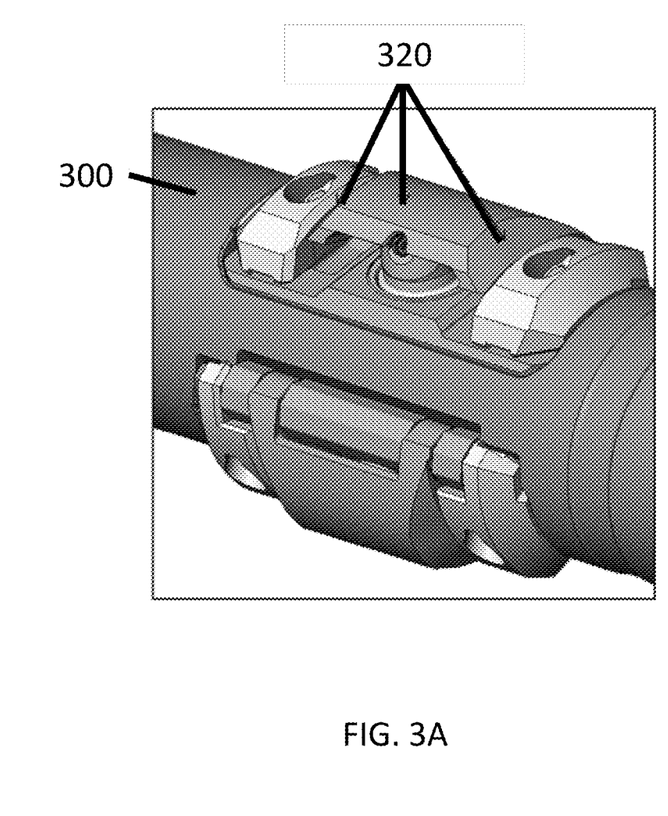
FIG. 3A shows an illustration of a hardfacing member disposed on an outer surface of a rotary steerable pad.
Figure 3B:
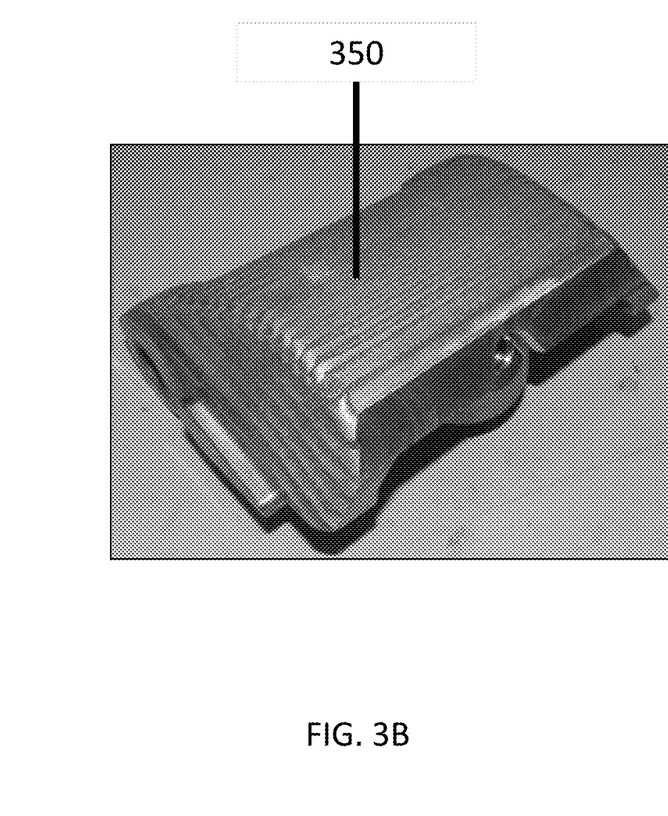
FIG. 3B shows a laser-applied hardfacing member with a net shape, which does not require further shape forming, such as grinding, to achieve the desired final shape.

FIG. 3A shows an illustration of a hardfacing member 320 disposed on an outer surface of a rotary steerable pad 300. The hardfacing member 320 is used for protection of the rotary steerable component. FIG. 3B shows a laser-applied hardfacing member 350 with a net shape, which does not require a further shape forming step, such as grinding, to achieve the desired final shape.

Figure 4A:
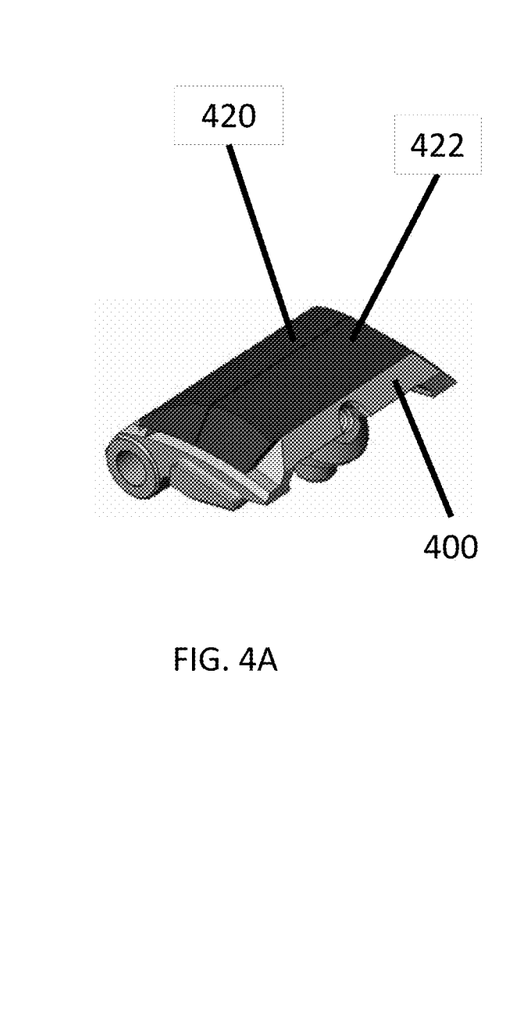
FIGS. 4A-4C illustrate an embodiment of a removable substrate on a main body.

FIG. 4A shows an embodiment of a rotary steerable pad 400 that has removable hardfacing members 420 and 422 that can be removably attached. As shown in FIG. 4A, the hardfacing members 420 and 422 are shown as installed on the main body of the rotary steerable pad 400.

Figure 4B:
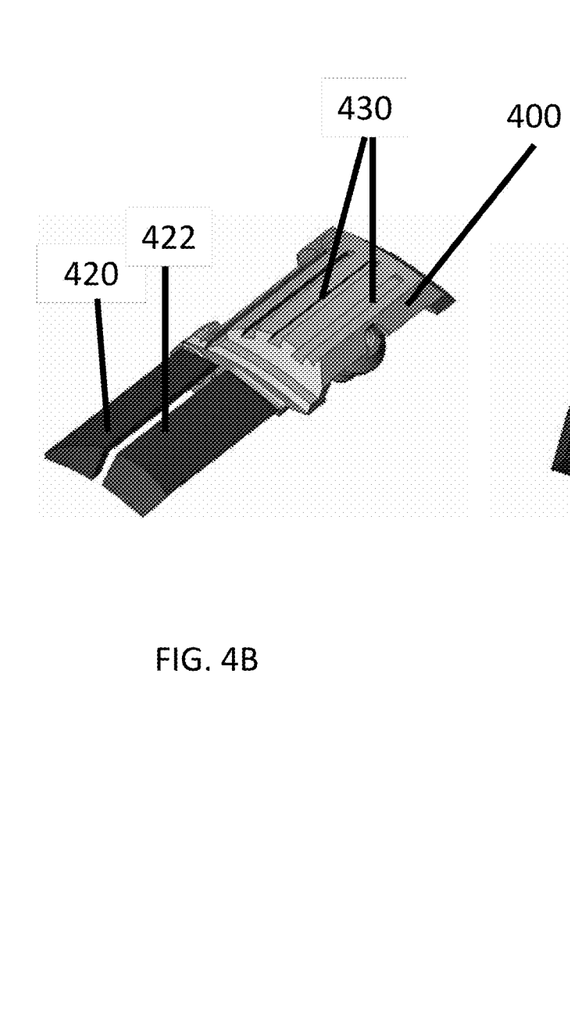
Figure 4C:
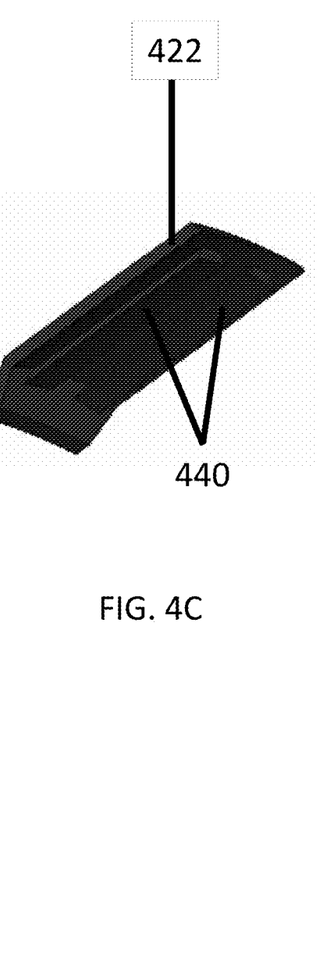

For this embodiment, the hardfacing members can be removable attached to a main body by shrink fit, dovetail grooves. As shown in FIG. 4B, hardfacing members 420 and 422 can be removed from the main body of the rotary steerable pad 400. The hardfacing members 420 and 422 can slide out of dovetail grooves 430 from the main body of the rotary steerable pad 400 thereby being removeably attached to the main body. One or more dovetail grooves 430 can be used to secure each of hardfacing members 420 and 422 onto the main body of the rotary steerable pad 400. FIG. 4C depicts an underside of hardfacing member 422 showing dovetail rails 440 which fit into the dovetail grooves 430 in the main body of the rotary steerable pad 400.

In some embodiments, an adhesive can also be used as an attachment mechanism because the large amount of available surface/contact area under a hardfacing member, such as harfacing members 420 and 422, and on the main body of a rotary steerable pad (e.g., 400). In other embodiments, brazing the dovetail joint is advantageously provides a stronger attachment to join hardfacing members (e.g., 420 and 422) to a main body of the rotary steerable pad (e.g., 400).

Figure 5A:
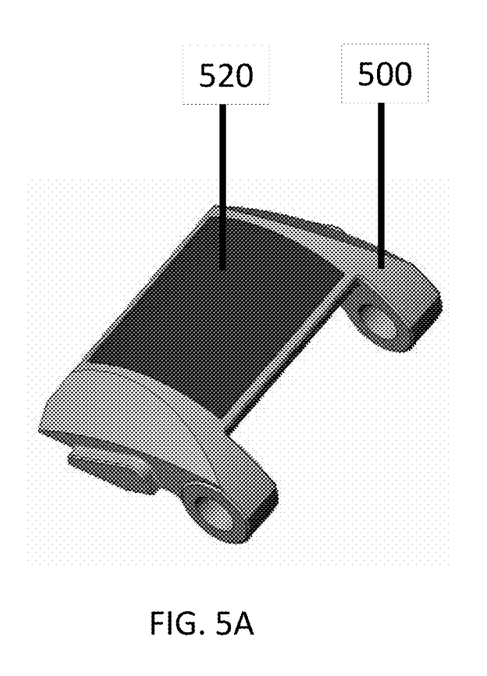
FIGS. 5A and 5B show an embodiment of a removable hardfacing member attached to a main body.

FIG. 5A shows an embodiment of a removable hardfacing member 520 attached to a main body 500. The hardfacing member 520 shown in FIG. 5A has a curved surface that accommodates the curved shape of the main body 500 it is designed to protect.

Figure 5B:
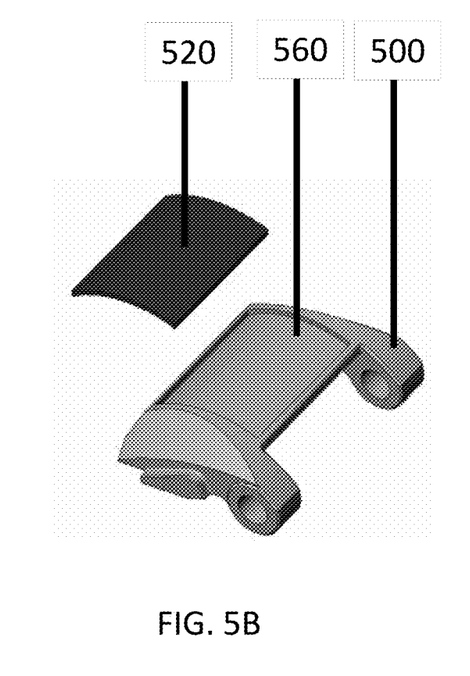

FIG. 5B shows the hardfacing member 520 removed from the main body 500. As described herein, the hardfacing member 520 can be formed with the desired curve surface prior to installation on the main body 500. For example, the curved surface of the hardfacing member 520 is designed to fit into a curve surface of a slot 560 of the main body 500. In some embodiments, an adhesive can also be used as an attachment mechanism because the large amount of available surface/contact area under the hardfacing member 520 and of the slot 560 of the main body 500. In other embodiments, brazing the hardfacing member 520 is another advantageous method of adjoining the hardfacing member 520 to the main body 500.

In some embodiments, the hardfacing member of the present disclosure comprises a single piece of any of the particle-embedded metal matrix material, including sintered material made of WC matrix and WC and/or diamond particles. In some embodiments, the hardfacing member is brazed to the main body of the pad. In some embodiments, the hardfacing member can include a plurality of hardfacing pieces. In some embodiments, the impact toughness of the hardfacing member is increased by increasing the thickness of the hardfacing member or by adjusting the composition of the particle-embedded metal matrix material.

In some embodiments, the impact toughness of the hardfacing member is increased by the use of a ductile sheet of metal between the hardfacing and the main body of the pad. The ductile sheet can be a metal ductile sheet, such as a copper sheet, an aluminum sheet, etc. For example, the ductile sheet would act as a soft material that would deform and absorb the impact energy, while reducing the overall stiffness of the hardfacing member-main body of the pad.

Figure 6A:
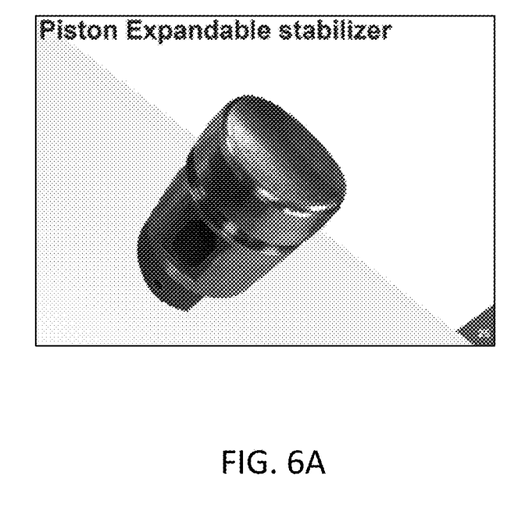
FIGS. 6A and 6B show images of a piston with a brazed attachment of a sintered part made of tungsten carbide and diamond.
Figure 6B:
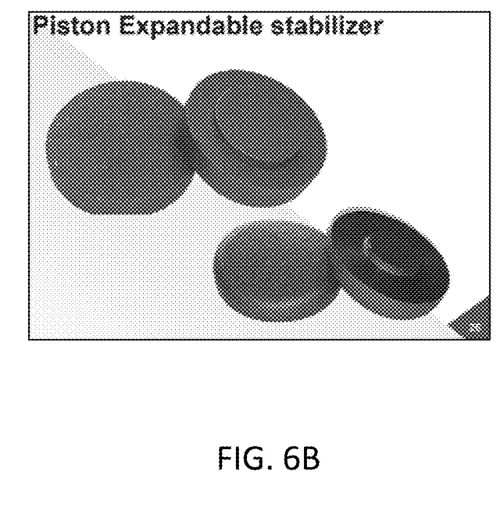

FIG. 6A shows an image of a piston with a brazed attachment of a sintered part made of tungsten carbide and diamond. FIG. 6B shows an image of another type of a piston with a brazed attachment of a sintered part made of tungsten carbide and diamond. The sintered carbide with diamond impregnation has been observed in adjustable gauge stabilizers. However, the brazed attachment of sintered part made of WC and diamond cannot be removed from the piston, whereas the methods and application described herein are directed to removable or swappable hardfacing members that can be removably installed on a rotary steerable tool.

The present disclosure provides drill bits and other downhole tools with hardfacing that may provide substantially enhanced performance as compared with prior hardfacing materials. In accordance with the present disclosure, such hardfacing may include tungsten carbide particles formed with an amount of binding material having a weight percentage between approximately three percent (3%) and less than five percent (5%) of each tungsten carbide particle. Other particles of superabrasive and/or superhard materials may also be metallurgically bonded with a metal matrix material to form such hardfacing. Examples of hard particles satisfactory for use with the present disclosure may include encapsulated diamond particles, coated diamond particles, silicon nitride ($Si_3N_4$), silicon carbide (SiC), boron carbide ($B_4C$) and cubic boron nitride (CBN). Such hard particles may be dispersed within and bonded to the metal matrix material.

Further aspects of the present disclosure may include mixing coated or encapsulated diamond particles with tungsten carbide particles having an optimum weight percentage of binding materials to provide enhanced hardfacing on a drill bit or other downhole tool. The use of conventional tungsten carbide particles with tungsten carbide particles incorporating teachings of the present disclosure may be appropriate for some downhole drilling operating conditions.

As discussed later in more detail, a metal matrix material or a hardfacing member may include a wide variety of hard materials and hard particles plus coated or encapsulated diamond particles. The hard materials and/or hard particles used to form metal matrix material can provide a wear resistant layer of material even without the addition of coated or encapsulated diamond particles. As a result of the present invention which includes the use of coated or encapsulated diamond particles, the metal matrix material has significantly enhanced wear resistance and abrasion resistance as compared to prior hardfacing materials.

For purposes of the present application, the terms "interfacial strength" or "bond strength" refers to chemical bond strength, i.e. strong attractive forces that hold together atoms and/or molecules in a crystalline or metallic structure.

Each coated or encapsulated diamond particle includes a carbide coating, which has been metallurgically bonded to exterior of the respective diamond particle. Preferably, exterior surface of each diamond particle will be completely covered by the carbide coating. For some operating environments, the carbide coating may perform satisfactorily with less than one hundred percent (100%) coating on each diamond particle.

A diamond particle may be either a synthetic diamond or a natural diamond. Also, each diamond particle may be a whole diamond, only a portion of a diamond or a polycrystalline diamond. For some applications, diamond particles are selected with a mesh range of sixty to eighty U.S. Mesh.

Depending upon the intended application, each diamond particle may be selected within the same mesh range. For other applications, coated or encapsulated diamond particles may be formed from diamond particles selected from two or more different mesh ranges. The resulting coated diamond particles will preferably have approximately the same exterior dimensions. However, by including diamond particles with different mesh ranges, the wear, erosion and abrasion resistance of the resulting metal matrix material may be modified to accommodate the specific operating environment associated with substrate.

The general process of coating diamond particles may follow any suitable technique known in the art, as further modified or specified herein. Such modifications include encapsulating the diamond with heavier elements, such as to manufacture the diamond powders with thick coatings of W, Ni, or Co, wherein the higher-melting W provides thermal shielding to the diamond while transporting via laser. The hard material used to form the carbide coating and the thickness of carbide coating may be varied depending upon the intended application. The carbide coating is preferably formed from material which can be sintered to provide a relatively dense layer which fully encapsulates the respective diamond particle. If the coating is not applied, diamond particles may be damaged by the temperatures required by many hardfacing techniques to bond with the metal matrix material. Encapsulating or cladding diamond particles with the carbide coating protects the respective diamond particle from the heat associated with the selected hardfacing procedures. Also, without coating, diamond particles may have a tendency to float to the surface of molten welding materials.

In some embodiments, the carbide coating is sintered after being placed on the respective diamond particle. The sintering process is used to form coated or encapsulated diamond particles having a density which is equal to or greater than the density of metal matrix material. Varying the composition of the coating can also be used to vary the density of the resulting coated or encapsulated diamond particle. Thus, coated diamond particles will be uniformly dispersed within the metal matrix material.

The material used to form the coating is selected to be metallurgically and chemically compatible with the material used to form metal matrix material. For many applications, the same material or materials used to form the coating may be used. For other applications, the coating can include with small grains materials formed from other boride, carbide, oxide, and/or nitride materials.

In some embodiments, a method includes injecting a plurality of particles into a heated metal matrix material thereby forming a mixture of the particles and the heated metal matrix material; disposing the mixture on at least a portion of a substrate thereby forming a hardfacing member having a particle-embedded metal matrix material; and removably attaching the hardfacing member to a main body. In some embodiments, the method further includes heating the metal matrix material using a laser process; and adjusting an energy input from the laser process to increase interfacial strength between the plurality of particles and the metal matrix material.

In some embodiments of the method, the plurality of particles includes at least one of: tungsten carbide, encapsulated diamond, or sintered diamond. In some embodiments, the encapsulated diamond includes a diamond with a coating of at least one of: tungsten carbide or borocarbide. In some embodiments, the plurality of particles constitutes at least 50 weight percentage of the mixture.

In some embodiments, the attaching the hardfacing member to the main body is permanent. In some embodiments, removably attaching the hardfacing member to the main body is made permanent via brazing. In some embodiments, removably attaching the hardfacing member to the main body is performed via a removable attachment mechanism. In some embodiments, the removable attachment mechanism includes at least one of: a shrink-fit mechanism, or an adhesive. In some embodiments, the shrink-fit mechanism includes a deformable soft material from at least one of: a copper gasket, or a copper sheet.

In some embodiments, the plurality of particles are in a bimodal distribution of particles having large size particles in the range between about 200 μm and about 1 mm constituting between 30-70 weight percentage of the plurality of particles and small size particles in the range between about 15 μm and 125 μm constituting the remaining weight of the plurality of particles. In other embodiments, the metal matrix material comprises iron-based material including at least one of: cobalt, chromium, niobium, nickel, titanium, boron, molybdenum, aluminum, copper, carbon, manganese, vanadium, or silicon.

In some embodiments, an article includes a main body; and a hardfacing member removably attached to the main body, wherein the hardfacing member includes a plurality of particles embedded in a metal matrix material, and wherein the plurality of particles comprises at least one of: tungsten carbide, encapsulated diamond, or sintered diamond. In some embodiments, the encapsulated diamond includes a diamond with a coating of at least one of: tungsten carbide or borocarbide. In some embodiments, the hardfacing member is removably attached to the main body via a removable attachment mechanism. In some embodiments, the removable attachment mechanism includes at least one of: a shrink-fit mechanism, or an adhesive. In some embodiments, the shrink-fit mechanism includes a deformable soft material from at least one of: a copper gasket, or a copper sheet.

In some embodiments, a method includes heating a metal matrix material having a nanocrystalline grain size; injecting a plurality of particles into the heated metal matrix material thereby forming a mixture, wherein the plurality of particles comprises at least one of: tungsten carbide, encapsulated diamond, or sintered diamond; disposing the mixture on at least a portion of a substrate thereby forming a hardfacing member having a particle-embedded metal matrix material; attaching the hardfacing member to a main body via at least one of: brazing or a removable mechanism; and introducing the main body to a wellbore formation for drilling operations.

In some embodiments, the encapsulated diamond includes a diamond with a coating of at least one of: tungsten carbide or borocarbide. In some embodiments, the plurality of particles are in a bimodal distribution of particles having large size particles in the range between about 200 μm and about 1 mm constituting between 30-70 weight percentage of the plurality of particles and small size particles in the range between about 15 μm and 125 μm constituting the remaining weight of the plurality of particles. In some embodiments, attaching the hardfacing member to the main body occurs via a removable attachment mechanism. In some embodiments, the removable attachment mechanism includes at least one of: a copper gasket, or a copper sheet.

What is claimed is:

1. A method comprising:
    injecting a plurality of particles into a heated metal matrix material thereby forming a mixture of the particles and the heated metal matrix material, wherein the plurality of particles are in a bimodal distribution of particles having large size particles in the range between about 200 μm and about 1 mm constituting between 30-70 weight percentage of the plurality of particles and small size particles in the range between about 15 μm and 125 μm constituting the remaining weight of the plurality of particles;
    disposing the mixture on at least a portion of a substrate thereby forming a hardfacing member having the substrate and a particle-embedded metal matrix material; and
    removably attaching the hardfacing member to a main body of a rotary steerable pad of a rotary steerable tool via a removable attachment mechanism.

2. The method of claim 1, further comprising:
    heating the metal matrix material using a laser process; and
    adjusting an energy input from the laser process to increase interfacial strength between the plurality of particles and the metal matrix material.

3. The method of claim 1, wherein the plurality of particles comprises at least one of: tungsten carbide, encapsulated diamond, or sintered diamond.

4. The method of claim 3, wherein the encapsulated diamond includes a diamond with a coating of at least one of: tungsten carbide or borocarbide.

5. The method of claim 1, wherein the plurality of particles constitutes at least 50 weight percentage of the mixture.

6. The method of claim 1, wherein the removable attachment mechanism includes an adhesive.

7. The method of claim 1, wherein the removable attachment mechanism comprises a shrink-fit mechanism, and wherein the shrink-fit mechanism includes a deformable soft material from at least one of: a copper gasket, or a copper sheet.

8. The method of claim 1, wherein the metal matrix material comprises an iron-based material including at least one of: cobalt, chromium, niobium, nickel, titanium, boron, molybdenum, aluminum, copper, carbon, manganese, vanadium, or silicon.

9. The method of claim 1, wherein the metal matrix material comprises a nanocrystalline grain size.

10. The method of claim 1, wherein the metal matrix material comprises a nanosteel selected from the group consisting of SHS9192P, SHS9290P, SHS9500P, SHS9700P and SHS9800P.

11. The method of claim 1, wherein disposing the mixture on at least a portion of a substrate comprises guiding mixture onto the substrate via a feeding hopper, wherein the mixture is configured to melt and fall through the feeding hopper in response to heating.

12. The method of claim 1, further comprising the step of heating the metal matrix material using a plasma transfer arc process.

13. The method of claim 1, further comprising the step of heating the metal matrix material using an oxyacetylene process.

14. The method of claim 1, further comprising the step of heating the matrix material using a metal arc welding process.

15. The method of claim 1, further comprising the step of introducing the main body into a wellbore formation for drilling operations.

16. The method of claim 1, wherein the removable attachment mechanism comprises dovetail grooves formed in the main body and corresponding dovetail rails formed in the hardfacing member, wherein the dovetail rails are slidable into the dovetail grooves to attach the hardfacing member to the main body, and wherein the dovetail rails are slidable out of the dovetail grooves to remove the hardfacing member from the main body.

17. The method of claim 1, wherein injecting the plurality of particles into the heated metal matrix comprises injecting the plurality of particles via the injection process that utilizes a feed system comprising feed hoppers.

* * * * *